US012725987B2

(12) United States Patent
Fu

(10) Patent No.: US 12,725,987 B2
(45) Date of Patent: Sep. 1, 2026

(54) SAFETY CONNECTOR AND PORTABLE STANDBY STARTING DEVICE FOR VEHICLE

(71) Applicant: Hainan Xunwei Technology Co., Ltd., Haikou (CN)

(72) Inventor: Gonghai Fu, Haikou (CN)

(73) Assignee: Hainan Xunwei Technology Co., Ltd., Haikou (CN)

( * ) Notice: Subject to any disclaimer, the term of this patent is extended or adjusted under 35 U.S.C. 154(b) by 0 days.

(21) Appl. No.: 19/329,943

(22) Filed: Sep. 16, 2025

(65) Prior Publication Data

US 2026/0005478 A1 Jan. 1, 2026

Related U.S. Application Data

(63) Continuation of application No. PCT/CN2023/121939, filed on Sep. 27, 2023.

(30) Foreign Application Priority Data

Mar. 16, 2023 (CN) ........................ 202320516531.0

(51) Int. Cl.
*H01R 13/66* (2006.01)

(52) U.S. Cl.
CPC .................................. *H01R 13/665* (2013.01)

(58) Field of Classification Search
None
See application file for complete search history.

(56) References Cited

U.S. PATENT DOCUMENTS 9,306,341 B2 * 4/2016 Wang ................... H01R 13/665
9,647,369 B2 * 5/2017 Tsai ..................... H01R 13/405
10,148,105 B2 * 12/2018 Lei .......................... F02N 11/10
10,797,449 B2 * 10/2020 Chuang .............. H01R 13/6594
2015/0349514 A1 * 12/2015 Chen ........................ H02H 3/18 361/84
2017/0334299 A1 * 11/2017 Chang ................... H01M 10/42
2018/0345803 A1 * 12/2018 Nook ...................... B60L 53/18

FOREIGN PATENT DOCUMENTS

| | | | | |
|---|---|---|---|---|
| CN | 204732619 U | | 10/2015 | |
| CN | 204885731 U | | 12/2015 | |
| CN | 206532977 U | | 9/2017 | |
| DE | 202021003986 U1 | * | 5/2022 | ............. H02J 7/663 |
| JP | 2014157718 A | | 8/2014 | |

OTHER PUBLICATIONS

International Search Report issued in corresponding PCT Application No. PCT/CN2023/121939, dated Dec. 28, 2023.

* cited by examiner

*Primary Examiner* — Tho D Ta
(74) *Attorney, Agent, or Firm* — Westbridge IP LLC

(57) ABSTRACT

A safety connector includes a housing, a cable assembly and an electrical connection assembly. A control board is disposed inside the housing, and a power supply connection member is disposed on a side of the housing. The cable assembly includes at least one first cable and at least two second cables. The electrical connection assembly includes a first electrical connection member and a second electrical connection member. The power supply connection member is connected to the first electrical connection member through the at least one first cable, and the power supply connection member, the control board, and the second electrical connection member are sequentially connected through the at least two second cables.

20 Claims, 3 Drawing Sheets

SAFETY CONNECTOR AND PORTABLE STANDBY STARTING DEVICE FOR VEHICLE

CROSS-REFERENCE TO RELATED APPLICATIONS

The present application is a continuation of the International Application No. PCT/CN/2023/121939, filed on Sep. 27, 2023, which claims priority to Chinese Patent Application No. 202320516531.0, filed on Mar. 16, 2023. The disclosures of the aforementioned disclosure are hereby incorporated by reference in their entireties.

TECHNICAL FIELD

The present disclosure relates to the field of technologies of a portable standby starting device for a vehicle, and in particular, to a safety connector and a portable standby starting device for a vehicle.

BACKGROUND

An electrical connection clamp is a commonly used tool for charging vehicle batteries. To ensure safety performance during power transmission, a safety connector is generally disposed on a wire body of a cable. Through this safety connector, voltage or current levels during transmitting power for the vehicle battery are detected, so that the safety of the power transmission of the vehicle battery is better ensured.

SUMMARY

In view of this, the present disclosure provides a safety connector and a portable standby starting device for a vehicle, so as to at least solve the problem of low safety in the use of a safety connector in related technologies.

According to some embodiments of the present disclosure, a safety connector is provided. The safety connector includes:

a housing, a control board being disposed inside the housing, and a power supply connection member being disposed on a side of the housing;

a cable assembly, which includes at least one first cable and at least two second cables; and an electrical connection assembly, which includes a first electrical connection member and a second electrical connection member.

The power supply connection member is connected to the first electrical connection member through the at least one first cable. The power supply connection member, the control board, and the second electrical connection member are sequentially connected through the at least two second cables.

Optionally, the electrical connection assembly includes an electrical connection clamp assembly, and the electrical connection clamp assembly includes a first electrical connection clamp and a second electrical connection clamp.

Optionally, the first cable is formed with at least one connection part, and the connection part is connected to the control board.

Optionally, the first cable may be provided with a first conductor and a first protective cover, and the first protective cover covers an exterior of the first conductor; and at the connection part of the first cable, a portion or all of the exterior of the first conductor is not covered by the first protective cover.

Optionally, the connection part of the first cable is welded the control board or is connected to the control board through a cable.

Optionally, the safety connector also includes at least one insulating member, and a portion or all of the exterior of the connection part is covered by the insulating member.

Optionally, the cable assembly includes a first sub-first cable and a second sub-first cable, an end of the first sub-first cable is connected to the power supply connection member, the other end of the first sub-first cable is connected to an end of the second sub-first cable and the control board, and the other end of the second sub-first cable is connected to the first electrical connection member.

Optionally, the first sub-first cable may be formed with at least one connection part, and the connection part is connected to the control board.

Optionally, the first sub-first cable is provided with a first sub-conductor and a first sub-protective cover, and the first sub-protective cover covers the exterior of the first sub-conductor; and at the connection part of the first sub-first cable, a portion or all of the exterior of the first sub-conductor is not covered by the first sub-protective cover.

Optionally, the connection part of the first sub-first cable is welded to the control board or is connected to the control board through a cable.

Optionally, the cable assembly includes a first sub-first cable, a second sub-first cable and a third sub-first cable, an end of the first sub-first cable is connected to the power supply connection member, the other end of the first sub-first cable is connected to an end of the second sub-first cable and the control board, the other end of the second sub-first cable is connected to an end of the third sub-first cable and the control board, and the other end of the third sub-first cable is connected to the first electrical connection member.

Optionally, the first sub-first cable, the second sub-first cable, and the third sub-first cable are welded to the control board.

Optionally, a side of the control board close to the power supply connection member is formed with a concave part, and the concave part is configured to accommodate the power supply connection member.

Optionally, the power supply connection member includes a first electrode terminal, a second electrode terminal, and at least one communication terminal. The first electrode terminal and the first electrical connection member are connected through the at least one first cable. The second electrode terminal, the control board, and the second electrical connection member are sequentially connected through the at least two second cables, and the communication terminal is connected to the control board.

Optionally, the communication terminal is connected to the control board through a signal line.

Optionally, the information transmitted by the signal line includes at least one of a temperature, a voltage, and a current.

Optionally, the communication terminal is disposed between the first electrode terminal and the second electrode terminal.

Optionally, the communication terminal is disposed at an end of the first electrode terminal of the power supply connection member, or is disposed at an end of the second electrode terminal of the power supply connection member.

Optionally, the first cable and the second cable may be placed on a same side of the control board.

Optionally, at least one side of the housing is formed with a through hole.

Optionally, the cable assembly includes a first sub-second cable and a second sub-second cable. A first end of the first sub-second cable is connected to the power supply connection member, and a second end of the first sub-second cable is connected to the control board. A first end of the second sub-second cable is connected to the control board, and A second end of the second sub-second cable is connected to the second electrical connection clamp.

According to some other embodiments of the present disclosure, a portable standby starting device for a vehicle is provided, which includes a power source and the aforementioned safety connector.

According to the safety connector of the present disclosure, there are a plurality of the cables connecting the power supply connection member and the electrical connection assembly, that is, there are at least one first cable and at least two second cables. The end of the cable away from the power supply connection member or the electrical connection assembly is connected to the control board. In the case that there are a plurality of contact points between the cable and the control board, an installation efficiency and a detection effect are improved through a reasonable structural layout in a limited space, thereby enhancing the safety of the safety connector.

BRIEF DESCRIPTION OF THE DRAWINGS

In order to more clearly illustrate technical solutions of embodiments of the present disclosure, drawings required for the embodiments will be briefly introduced in the following. It should be understood that the following drawings only show some embodiments of the present disclosure, and therefore, they should not be considered as a limitation on the protection scope. For those skilled in the art, other related drawings can be obtained from these drawings without creative effort.

DETAILED DESCRIPTION OF THE EMBODIMENTS

Figure 1:
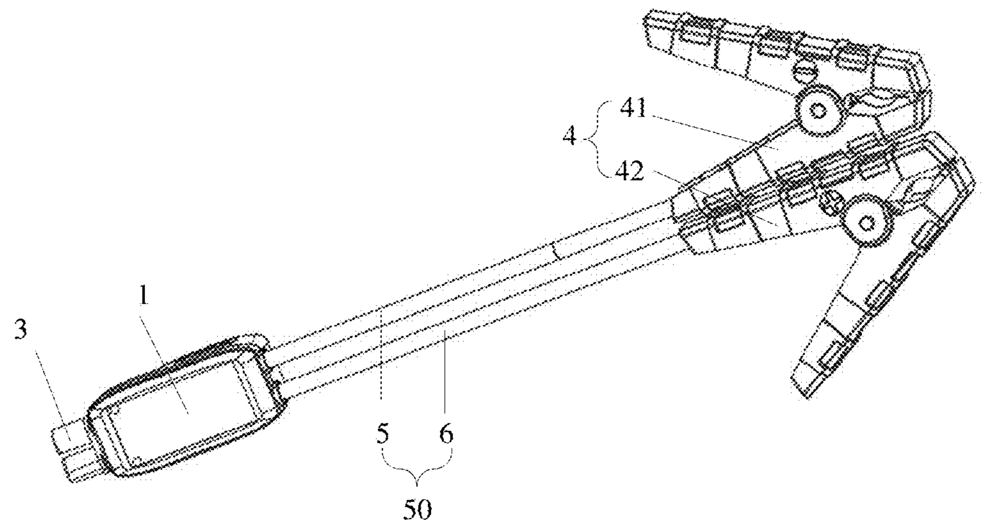
FIG. 1 is a schematic diagram of a safety connector according to some embodiments of the present disclosure.

The following embodiments are provided to help a reader to gain a comprehensive understanding on the methods, devices, and/or systems described herein. Apparently, various changes, modifications, and equivalents of the methods, devices, and/or systems described herein will be obtained after understanding the c of the present disclosure. For example, the order of operations described herein is merely exemplary and is not limited to the order set forth herein, it may be changed after understanding the content of the present disclosure, except for the operations that must be performed in a specific order. In addition, description of features known in the art may be omitted for clarity and conciseness.

The features described herein may be implemented in different forms, and should not be interpreted as being limited to the examples described herein. More precisely, the examples described herein are merely provided for illustration, and some of the many feasible ways in which the methods, devices, and/or systems described herein may be implemented after understanding the disclosure of the present disclosure.

Throughout the specification, when an element (such as a layer, region, or substrate) is described as being "on" another element, "connected to" another element, "coupled to" another element, "above" another element, or "covering" another element, it may be directly "on" another element, "connected to" another element, "coupled to" another element, "above" the other element, or "covering" another element, or there may be one or more other elements interposed therebetween. In contrast, when an element is described as being "directly on" another element, "directly connected to" another element, "directly coupled to" another element, "directly above" another element, or "directly covering' another element, there may be no other elements interposed therebetween.

As used herein, the term "and/or" includes any one of the related items listed and any combination of two or more of the related items.

Although terms such as "first", "second", and "third" may be used herein for describing various members, assemblies, regions, layers, or sections, but these members, assemblies, regions, layers, or sections are not limited by these terms. More precisely, these terms are only used for distinguishing one member, assembly, region, layer, or section from another member, assembly, region, layer, or section. Therefore, without departing from the teachings of the examples, a first member, assembly, region, layer, or section described in the examples herein may also be referred to as a second member, assembly, region, layer, or section.

For ease of description, spatial relationship terms such as "above", upper", "below" and "lower" are used for describing the relationship between one element and another element as shown in the drawings. Such spatial relationship terms are intended to include not only the orientations depicted in the drawings but also different orientations of a device during use or operation. For example, if the device in the drawing is turned over, the element described as being "above" or "upper" relative to another element will subsequently be "below" or "lower" relative to another element. Therefore, the term "above" includes both "above" and "below" depending on the spatial orientation of the device. The device may also be positioned in other ways (for example, be rotated 90 degrees or in other orientations), and the spatial relationship terms used herein will be interpreted accordingly.

The terms used herein are only for describing various examples and are not intended to limit the present disclosure. Unless the context clearly indicates otherwise, the singular form is also intended to include the plural form. The terms "include", "comprise", and "have" enumerate the described features, quantities, operations, components, elements, and/or combinations thereof, but they do not exclude the presence or addition of one or more other features, quantities, operations, components, elements, and/or combinations thereof.

Due to manufacturing techniques and/or tolerances, there may be variations in the shapes shown in the drawings.

Therefore, the examples described herein are not limited to the specific shapes shown in the drawings, but include changes in shape that occur during manufacturing.

The features of the examples described herein may be combined in various ways after understanding the content of the present disclosure. In addition, although the examples described herein have various configurations, other configurations are possible obtained after understanding the content of the present disclosure.

The safety connector in the related art includes control board and positive and negative lines connected to control board, but lacks an internal structure layout scheme for safety connector, and an unreasonable layout can lead to unsatisfactory installation efficiency and detection effectiveness, i.e., poor timeliness and accuracy of detection, which reduces the safety of using battery cable clamps.

In order to make the above objectives, features, and advantages of the present disclosure more clear and more understandable, preferred embodiments will be described in detail with reference to the accompanying drawings below.

According to some embodiments of the present disclosure, a safety connector is provided. As shown in FIG. 1 to FIG. 5, the safety connector includes a housing 1, a control board 2 disposed inside the housing 1, a power supply connection member 3 disposed on a side of the housing 1 (for example, ta left end in an extension direction thereof), a cable assembly 50 and an electrical connection assembly 4. The electrical connection assembly 4 may be one or two of an electrical connection clamp assembly, a vehicle battery terminal assembly, a wiring terminal assembly, and the like, and is used for being connected to positive and negative terminals of a vehicle battery. The cable assembly 50 includes at least one first cable 5 and two second cable 6, and the electrical connection assembly 4 includes a first electrical connection member 41 and a second electrical connection member 42. The power supply connection member 3 is connected to the first electrical connection member 41 through the at least one first cable 5. The power supply connection member 3, the control board 2, and the second electrical connection member 42 are sequentially connected through the at least two second cables 6. In some examples, the electrical connection assembly 4 is an electrical connection clamp assembly, which includes a first electrical connection clamp 41 and a second electrical connection clamp 42, and the power supply connection member 3 is connected to the first electrical connection clamp 41 through the at least one first cable 5. The power supply connection member 3, the control board 2, and the second electrical connection clamp 42 are sequentially connected through the at least two second cables 6, thereby establishing a circuit path from a power supply to battery electrodes to enable an engine of the vehicle to start. The connection methods and functions of the various components of the safety connector according to the present disclosure will be described in detail in the following.

Figure 5:
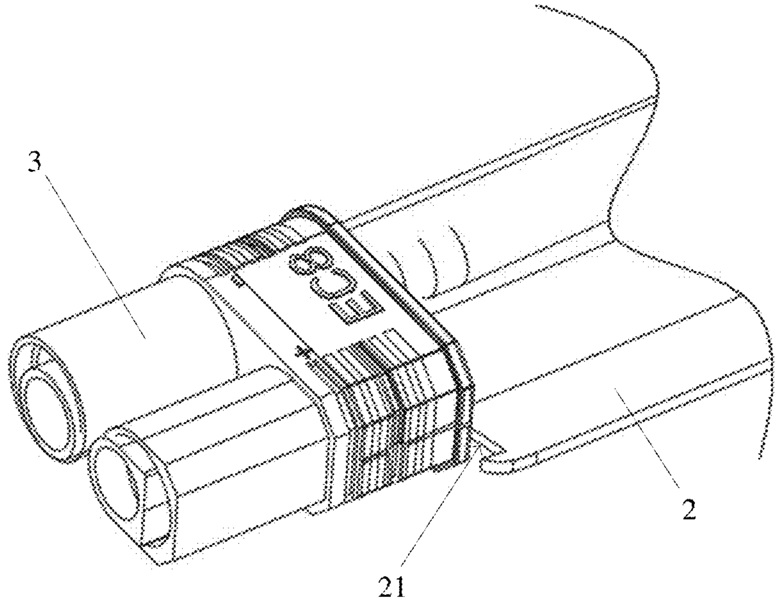
FIG. 5 is another schematic diagram of a safety connector according to some embodiments of the present disclosure.

In the embodiments of the present disclosure, the first cable 5 and the second cable 6 play a role in transmitting electricity from the power supply to the vehicle. Therefore, the first cable 5 and the second cable 6 are separately provided with a first conductor 71 which is capable of transmitting the electricity and a first protective cover 72 wrapped around and enveloping the exterior of the first conductor 71, so that first the protective cover 72 ensures the safety of the safety connector during use, thereby avoiding dangerous situations such as electric leakage. In addition, the power supply connection member 3 is connected to the power supply, and has a first electrode terminal 31 and a second electrode terminal 32 which are respectively used for connecting the first cable 5 and the second cable 6. As shown in FIG. 5, the power supply connection member 3 has an anti-reverse connection structure, and allowing it to be assembled to the power supply in only a single orientation, thereby ensuring the correct orientation of the positive and negative electrical connection between the power supply connection member 3 and the power supply. In some examples, the power supply connection member 3 is circular at an end close to the first electrode terminal 31, and is non-circular at an end close to the second electrode terminal 32. In addition, the cable assembly 50 is located on the same side of the control board 2, which facilitates the fixation of the control board 2 and the housing 1 and improving the stability of an overall structural of the safety connector.

To further enhance the stability and consistency of the overall structure of the safety connector, a side of the control board 2 close to the power supply connection member 3 is also formed with a concave part 21 that is open towards the power supply connection member 3 (as shown in FIG. 5) to avoid interference between the power supply connection member 3 and the control board 2. Based on this, the specific position, size, and shape of the concave part 21 are not limited, and should be determined according to actual conditions such as a position, a size, and a shape of the power supply connection member 3.

Figure 2:
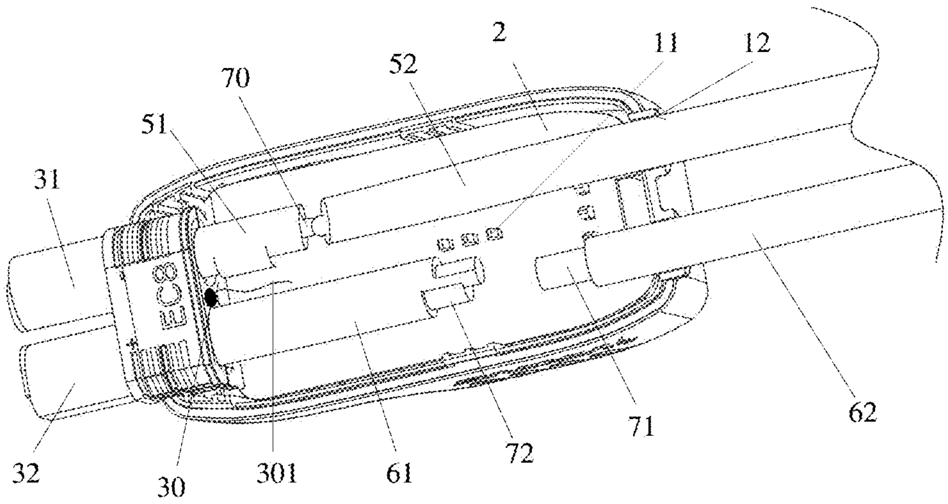
FIG. 2 is a schematic connection diagram of a safety connector according to some embodiments of the present disclosure.

In the cable assembly 50, the number of the first cable 5 is at least one, and the number of the second cable 6 is at least two. In some embodiments, two the first cable 5 (for example, a first sub-first cable 51 and a second sub-first cable 52, as shown in FIG. 2) and two the second cable 6 (for example, a first sub-second cable 61 and a second sub-second cable 62) are taken as an example for explanation. As shown in FIG. 2, a first end of the first sub-first cable 51 is connected to the first electrode terminal 31 of the aforementioned power supply connection member 3, a second end of the first sub-first cable 51 is connected to a first end of second sub-first cable 52 and control board 2, and a second end of the second sub-first cable 52 is connected to the first electrical connection clamp 41. It should be noted that, the second end of the first sub-first cable 51 is connected to the first end of the second sub-first cable 52 and the control board 2 means that a joint of the second end of the first sub-first cable 51 and the control board 2 coincides with a joint of the first end of the second sub-first cable 52 and the control board 2, thereby ensuring the continuity of power transmission.

In addition, to ensure the stability of the connection between the first sub-first cable 51 and the control board 2 and the connection between the second sub-first cable 52 and the control board 2, connection parts 70 are formed at the second end of the first sub-first cable 51 and the first end of the second sub-first cable 52, respectively. By connecting the connection part 70 with the control board 2, it ensures that the first sub-first cable 51 and the second sub-first cable 52 are in good contact with the control board 2. In some examples, the first conductor 71 at a position of the connection part 70 is partially or fully exposed to the outside, that is a portion or all of the first conductor 71 at the position of connection part 70 is not covered by the first protective cover 72 (referring to the illustration of the first conductor 71 and the first protective cover 72 in the second cable 6 below), which facilitates the connection part 70 being connected to the control board 2. However, an exposed area and shape of the first conductor 71 at the position of the connection part 70 are not specifically limited, as long as it ensures that the first sub-first cable 51 and the second sub-first cable 52 are in good contact with the control board 2. In addition, the connection method between the connection part 70 and the control board 2 is not specifically limited. For example, the connection part 70 may be connected to the control board 2 through welding or a cable, as long as it ensures the good contact between the connection part 70 and the control board 2 to maintain the continuity of the power transmission.

Similarly to the first cable 5, a first end of the first sub-second cable 61 is connected to the second electrode terminal 32 of the aforementioned power supply connection member 3, and a second end of the first sub-second cable 61 is connected to the control board 2. A first end of the second sub-second cable 62 is connected to the control board 2, and a second end of the second sub-second cable 62 is connected to the second electrical connection clamp 42.

It should be noted that, unlike the first cable 5, the second end of the first sub-second cable 61 and the first end of the second sub-second cable 62 are not directly connected to each other, and their on/off is able to be controlled by the control board 2, thereby increasing controllability of the safety connector during use. In addition, a joint between the second cable 6 and the control board 2 (for example, the second end of the first sub-second cable 61 and the first end of the second sub-second cable 62) is also formed with the aforementioned connection part 70. When the safety connector is working normally, the control board 2 is able to collect a current signal flowing through the power supply connection member 3 and/or a voltage signal between the two electrode terminals of the power supply connection member 3 through the connection part 70.

Figure 3:
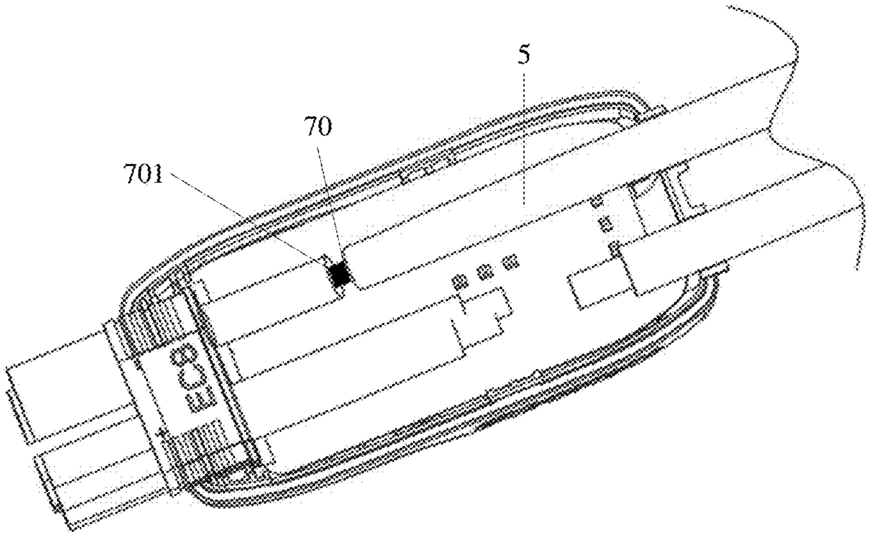
FIG. 3 is another schematic connection diagram of a safety connector according to some embodiments of the present disclosure.
Figure 4:
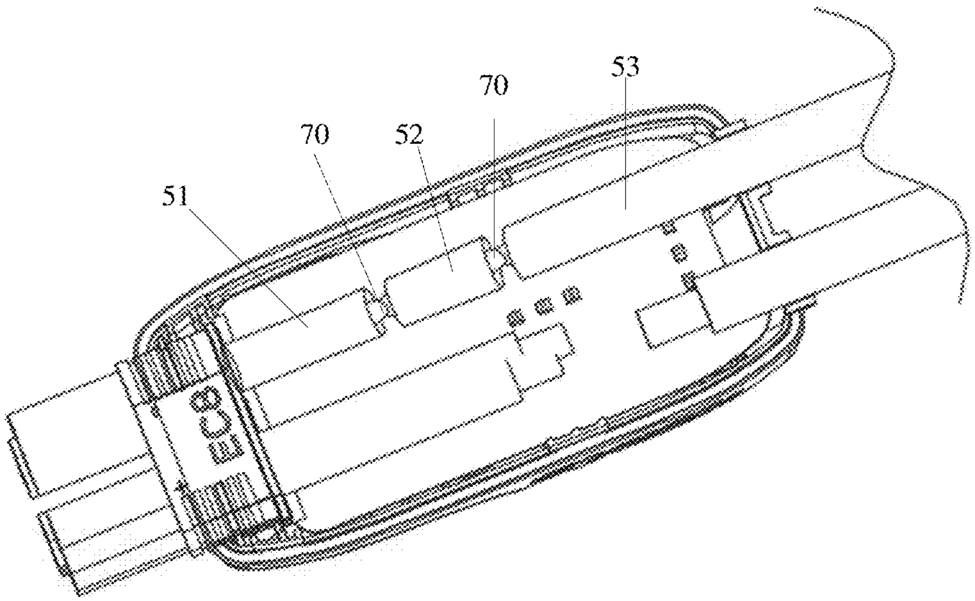
FIG. 4 is yet another schematic connection diagram of the safety connector according to some embodiments of the present disclosure.

However, it is not limited to this. As shown in FIG. 3, when the number of the first cable 5 is one, the aforementioned connection part 70 (a portion or all of the connection part 70 is covered by an insulating member 701) is formed at any position on its wire body (that is, the position on first cable 5 except for two endpoints), and the connection part 70 may be connected to the control board 2 through welding or a cable. Alternatively, as shown in FIG. 4, when the number of the first cable 5 is three, that is, the cable assembly 50 includes a first sub-first cable 51, a second sub-first cable 52, and a third sub-first cable 53, a first end of the first sub-first cable 51 is connected to the power supply connection member 3, a second end of the first sub-first cable 51 is connected to a first end of the second sub-first cable 52 and the control board 2, a second end of the second sub-first cable 52 is connected to a first end of the third sub-first cable 53 and the control board 2, and a second end of the third sub-first cable 53 is connected to the first electrical connection clamp 41. And the aforementioned connection parts 70 are formed at the second end of the first sub-first cable 51, two ends of the second sub-first cable 52, and the first end of the third sub-first cable 53, respectively. At this time, due to the excessive number of the first cable 5, the welding connection method is optionally used for connecting the connection part 70 with the control board 2, which may avoid short circuits and other issues caused by too many cables and also facilitates the installation of the safety connector.

In addition, in some embodiments, the control board 2 is set as a printed circuit board (PCB), which is capable of achieving multi-dimensional safety monitoring of the safety connector, thereby ensuring a detected efficiency of the safety connector and an accuracy of data detected by the safety connector, and thus ensuring the safety of the power transmission. In some embodiments, the power supply connection member 3 is also provided with at least one communication terminal 30, and the communication terminal 30 is connected to the control board 2 through a signal line 301, so that information of an internal power supply of the portable standby starting device of the vehicle is transmitted to the control board 2, the information includes at least one of a current, a voltage, or a temperature.

It should be noted that the connection methods of the signal line 301 with the communication terminal 30 and the control board 2 are not specifically limited. For example, the three may be sequentially connected by welding. In addition, the specific number of the communication terminal 30 and the signal line 301 should be determined according to actual conditions, as long as the requirements of the information to be detected is satisfied, that is, at least one of the current, the voltage, or the temperature of the internal power supply of the portable standby starting device of the vehicle is monitored through the signal line 301 and the communication terminal 30. It should be further noted that, in some examples, the communication terminal 30 is located between the aforementioned first electrode terminal 31 and second electrode terminal 32, but it is not limited to this. For example, the communication terminal 30 may be disposed at an end of the first electrode terminal 31 of the power supply connection member 3, or at an end of the second electrode terminal 32 of the power supply connection member 3, or may be disposed separately (not shown in the figure). In this way, it facilitates the connection of the power supply connection member 3 and the portable standby starting device for the vehicle, so that the communication terminal 30 is prevented from being easily damaged during installation, thereby improving the stability of the overall structural of the safety connector.

In addition, a shape of the housing 1 is not specifically limited, as long as it is capable of protecting the control board 2 and the cable assembly 50, and the like. At the same time, in some examples, wo ends in an extension direction of the housing 1 are formed with connection holes 12 corresponding to the first cable 5 and second cable 6 respectively, so as to facilitate the connection of the cable assembly 50 and the power supply connection member 3. In addition, at least one side of the housing 1 is provided with a plurality of through holes to facilitate the components such as a warning light 11 in the control board 2 to extend out.

According to the safety connector of the present disclosure, there are a plurality of the cables connecting the power supply connection member 3 and the electrical connection assembly 4, that is, there are at least one first cable 5 and at least two second cables 6. The end of the cable away from the power supply connection member 3 or the electrical connection assembly 4 is connected to the control board 2. In the case that there are a plurality of contact points between the first cable 5 and the second cable 6 and the control board 2, the installation efficiency and the detection effect are improved through a reasonable structural layout in a limited space, thereby improving the safety of the safety connector.

According to some other embodiments of the present disclosure, a portable standby starting device for a vehicle is provided, which includes a power supply and the aforementioned safety connector.

Finally, it should be noted that, the above-mentioned embodiments are only specific implementations of the present disclosure to illustrate the technical solutions of the present disclosure, and are not intended to limit it. The protection scope of the present disclosure is not limited to this. Although the present disclosure has been described in detail with reference to the aforementioned embodiments, those with ordinary skill in the art should understand that, within the technical scope disclosed in the present disclosure, any person skilled in the art can still make modifications or easily conceive of variations to the technical solutions recorded in the aforementioned embodiments, or perform equivalent substitutions for some of the technical features thereof; and these modifications, variations, or substitutions do not make the essence of the corresponding technical solutions depart from the spirit and protection scope of the technical solutions of the embodiments of the present disclosure, and should be covered within the protection scope of the present disclosure. Therefore, the protection scope of the present disclosure should be subject to the protection scope of the claims.

What is claimed is:

1. A safety connector, comprising:

a housing, a control board being disposed inside the housing, and a power supply connection member being disposed on a side of the housing;

a cable assembly, comprising at least one first cable and at least two second cables, wherein the at least one first cable and the at least two second cables respectively comprises a first cable and a second cable, parts of which are located inside the housing and other parts of which are located outside of the housing, the parts of the first cable and the second cable inside the housing are located on an outside of the control board, and the part of the first cable located inside the housing is directly connected to the control board through welding or a cable; and an electrical connection assembly, comprising a first electrical connection member and a second electrical connection member, wherein the power supply connection member is connected to the first electrical connection member through the at least one first cable; and the power supply connection member, the control board, and the second electrical connection member are sequentially connected through the at least two second cables.

2. The safety connector according to claim 1, wherein the electrical connection assembly comprises an electrical connection clamp assembly, and the electrical connection clamp assembly comprises a first electrical connection clamp and a second electrical connection clamp.

3. The safety connector according to claim 2, wherein the cable assembly comprises a first sub-second cable and a second sub-second cable, a first end of the first sub-second cable is connected to the power supply connection member, and a second end of the first sub-second cable is connected to the control board;

a first end of the second sub-second cable is connected to the control board, and a second end of the second sub-second cable is connected to the second electrical connection clamp; and the control board is configured to control the second end of the first sub-second cable and the first end of the second sub-second cable to be connected or disconnected.

4. The safety connector according to claim 1, wherein the first cable is formed with at least one connection part, and the connection part is connected to the control board.

5. The safety connector according to claim 4, wherein the first cable is provided with a first conductor and a first protective cover, and the first protective cover covers an exterior of the first conductor; and at the connection part of the first cable, a portion or all of the exterior is not covered by the first protective cover.

6. The safety connector according to claim 4, wherein the connection part of the first cable is welded to the control board or is connected to the control board through a cable.

7. The safety connector according to claim 6, further comprising at least one insulating member, wherein a portion or all of the exterior of the connection part is covered by the insulating member.

8. The safety connector according to claim 1, wherein the cable assembly comprises a first sub-first cable and a second sub-first cable, an end of the first sub-first cable is connected to the power supply connection member, the other end of the first sub-first cable is connected to an end of the second sub-first cable and the control board, and the other end of the second sub-first cable is connected to the first electrical connection member.

9. The safety connector according to claim 8, wherein the first sub-first cable is formed with at least one connection part, and the connection part is connected to the control board.

10. The safety connector according to claim 9, wherein the first sub-first cable is provided with a first sub-conductor and a first sub-protective cover, and the first sub-protective cover covers the exterior of the first sub-conductor; and at the connection part of the first sub-first cable, a portion or all of the exterior of the first sub-conductor is not covered by the first sub-protective cover.

11. The safety connector according to claim 9, wherein the connection part of the first sub-first cable is welded to the control board or is connected to the control board through a cable.

12. The safety connector according to claim 1, wherein the cable assembly comprises a first sub-first cable, a second sub-first cable and a third sub-first cable, an end of the first sub-first cable is connected to the power supply connection member, the other end of the first sub-first cable is connected to an end of the second sub-first cable and the control board, the other end of the second sub-first cable is connected to an end of the third sub-first cable and the control board, and the other end of the third sub-first cable is connected to the first electrical connection member.

13. The safety connector according to claim 12, wherein the first sub-first cable, the second sub-first cable, and the third sub-first cable are welded to the control board.

14. The safety connector according to claim 1, wherein a side of the control board close to the power supply connection member is formed with a concave part, and the concave part is configured to accommodate the power supply connection member.

15. The safety connector according to claim 1, wherein the power supply connection member comprises a first electrode terminal, a second electrode terminal and at least one communication terminal, and the first electrode terminal and the first electrical connection member are connected through the at least one first cable; and the second electrode terminal, the control board, and the second electrical connection member are sequentially connected through the at least two second cables, and the communication terminal is connected to the control board.

16. The safety connector according to claim 15, wherein the communication terminal is connected to the control board through a signal line.

17. The safety connector according to claim 16, wherein an information transmitted by the signal line comprises at least one of a temperature, a voltage and a current.

18. The safety connector according to claim 15, wherein the communication terminal is disposed between the first electrode terminal and the second electrode terminal.

19. The safety connector according to claim 1, wherein the first cable and the second cable are disposed on a same side of the control board.

20. A portable standby starting device for a vehicle, comprising the safety connector according to claim 1.

* * * * *